US005539897A

United States Patent [19]

Samanta et al.

[11] Patent Number: 5,539,897
[45] Date of Patent: Jul. 23, 1996

[54] BUFFER MEMORY MANAGEMENT WITH REGISTER LIST TO PROVIDE AN ORDERED LIST OF BUFFER MEMORY ADDRESSES INTO WHICH THE LATEST SERIES OF DATA BLOCKS IS WRITTEN

[75] Inventors: Manoj K. Samanta, Boulder; Timothy R. Feldman, Louisville; Clifford S. Fernalld, Jr., Boulder, all of Colo.

[73] Assignee: Fujitsu Limited, Kawasaki, Japan

[21] Appl. No.: 147,096

[22] Filed: Nov. 2, 1993

Related U.S. Application Data

[63] Continuation of Ser. No. 746,318, Aug. 16, 1991, abandoned.

[51] Int. Cl.[6] .............................. G06F 12/02; G06F 12/08
[52] U.S. Cl. ................... 395/492; 395/250; 364/DIG. 1
[58] Field of Search .............................. 364/200 MS File, 364/900 MS File, DIG. 1; 395/425, 250, 325, 492

[56] References Cited

U.S. PATENT DOCUMENTS

| | | | |
|---|---|---|---|
| 4,065,810 | 12/1977 | Cramer et al. | 395/846 |
| 4,866,601 | 9/1989 | Dulac et al. | 364/200 |
| 4,876,642 | 10/1989 | Gibson | 364/200 |
| 5,072,369 | 12/1991 | Theus et al. | 395/425 |
| 5,083,269 | 2/1992 | Syobatake et al. | 395/425 |

FOREIGN PATENT DOCUMENTS

| | | |
|---|---|---|
| 0404078 | 12/1990 | European Pat. Off. . |
| WO89/07296 | 8/1989 | WIPO . |
| WO91/13397 | 9/1991 | WIPO . |

*Primary Examiner*—Tod R. Swann
*Assistant Examiner*—James Peikari
*Attorney, Agent, or Firm*—Curtis Morris & Safford

[57] ABSTRACT

A buffer memory having addressable locations into which data blocks received from one of two or more devices are written and from which those data blocks are read to one of the other devices, is managed by a buffer memory controller. Selected, not necessarily sequential, buffer addresses are assigned by the controller to store data blocks included in a series supplied from the first device, and these assigned buffer addresses are loaded into register locations of a list register. Buffer addresses are read from an ordered list of the loaded register locations and respective data blocks are written into such addresses. Register locations from the ordered list are accessed to retrieve buffer addresses therefrom, and the data blocks stored in the retrieved buffer addresses are read from the buffer memory to the second device.

25 Claims, 2 Drawing Sheets

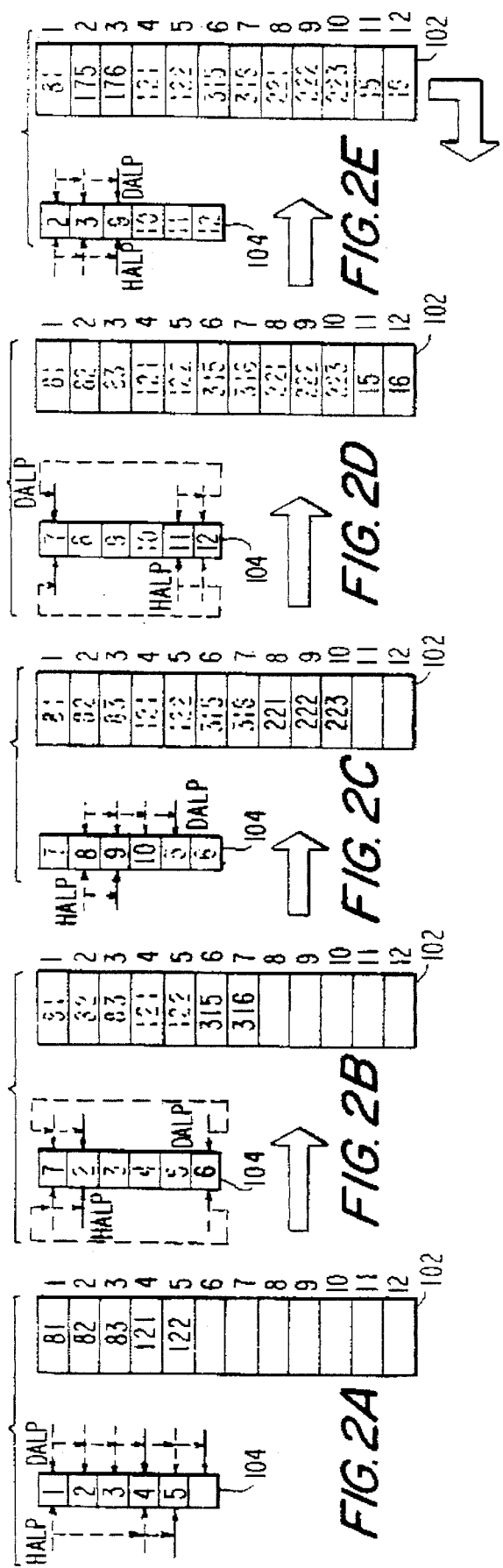

BUFFER MEMORY MANAGEMENT WITH REGISTER LIST TO PROVIDE AN ORDERED LIST OF BUFFER MEMORY ADDRESSES INTO WHICH THE LATEST SERIES OF DATA BLOCKS IS WRITTEN

This application is a continuation of application Ser. No. 07/746,318, filed Aug. 16, 1991 now abandoned.

BACKGROUND OF THE INVENTION

This invention relates to a buffer memory and, more particularly, to a buffer memory of the type provided in a data interface between devices, such as between a disc drive and one or more hosts, the memory being managed so as to support fragmented use thereof.

Interfaces commonly are provided between two or more data devices to permit data to be read from one device and supplied to the other. Such interfaces typically are provided between a data storage device and a data processing device, one example of the former being a disc storage device and one example of the latter being a host computer. A typical interface between a disc storage device, also known as a disc drive, and a host computer is the Small Computer System Interface (SCSI).

In general, an interface includes a temporary memory, such as a buffer memory, for storing data read from the disc drive in response to an access request by the host. The buffer memory is provided with addressable locations and the data is stored in "blocks" wherein each block of data is comprised of a predetermined number of bytes consistent with various conventional protocols. A controller cooperates with the buffer memory and usually operates to assign specific memory addresses to the respective data blocks read from or written to the disc drive and transferred to or from the host. The controller keeps track of those buffer addresses which are vacant as well as those which are occupied. The controller also keeps track of data blocks which have been called for from the disc drive by the host and have either been transferred to the host or are awaiting transfer.

During a typical "data read" operation, wherein data blocks are read from the disc drive, stored temporarily in the buffer memory and then transferred to the host, the host calls for a series of data blocks formed of a number of such blocks. In addition to retrieving the particular data blocks called for by the host, the controller operates to "prefetch" certain data blocks which, although not specifically called for, nevertheless are proximate those data blocks which have been requested and, thus, are reasonably expected to be called for in an ensuing read operation. Conventionally, the data blocks called for by the host as well as those which are prefetched by the controller are stored in successive buffer addresses. It will be appreciated that, over a period of time, that is, after several read operations, a significant number of data blocks may be stored in the buffer memory but not transferred to the host. For example, because of interruptions and other tasks carried out by the host, some data blocks which have been specifically called for might not yet have been read. As another example, many of the data blocks which were prefetched by the controller may not be requested and, thus, not retrieved, by the host. Consequently, the buffer memory will be provided with several filled addresses (i.e. addresses containing data blocks that have not yet been retrieved by the host) interspersed with available addresses (i.e. addresses which contained data blocks that have been retrieved). But, when a new series of data blocks is read or prefetched from the disc drive, the typical buffer memory and memory controller require those data blocks to be stored in sequential addresses. That is, such data blocks must be stored in consecutive addressable locations and cannot be stored in random addresses that nevertheless are available.

If the number of data blocks which are to be read from the disc drive exceeds the number of consecutive buffer addresses that are available to store those data blocks, the controller operates to determine which of the data blocks still stored in the buffer may be discarded or replaced by the new data blocks now called for by the host. This determination is made in accordance with a predetermined replacement algorithm known to those of ordinary skill in the art. Thus, data blocks which are unlikely to be transferred to the host are discarded. However, because of limitations in the storage capacity of the buffer, many data blocks which are discarded simply to enable the buffer to accommodate new data blocks read from the disc drive should have been retained. Consequently, useful data that had not yet been retrieved by the host is replaced by new data; and the replaced data thus is lost. Should the host now wish to be supplied with the data blocks that were discarded, a new data read operation must be executed, and the foregoing problem of replacing data blocks that have not yet been retrieved with new data blocks because of the requirement of storing data blocks in consecutive addresses is repeated.

It has been recognized that the effective use of a buffer memory will be improved if a series of data blocks called for by the host or prefetched by the buffer controller need not be stored in sequential addresses of the buffer memory. If a series of data blocks may be interspersed in the buffer with previously stored but not yet retrieved data blocks, the aforementioned problem of replacing useful data with new data would be substantially avoided. However, heretofore, an attempt to operate a buffer controller to permit such fragmentation of the buffer memory has been thought to be complicated and expensive. Special programming of the microprocessor normally used in the buffer controller likewise had been thought to be complicated and even beyond the operating capacity of the typical microprocessor. Hence, buffer fragmentation has not heretofore been permitted or supported in prior art buffer memories.

OBJECTS OF THE INVENTION

Therefore, it is an object of the present invention to provide an improved technique which supports the fragmentation of a buffer memory so as to avoid the aforementioned problems and difficulties of prior art buffer management arrangements.

Another object of this invention is to provide a technique for managing a buffer memory which communicates with data devices whereby the effective use of that memory is maximized.

A further object of this invention is to manage a buffer memory in an interface between data devices, wherein the risk of overwriting data destined for but not yet retrieved by one of those devices is minimized.

Yet another object of this invention is to manage a buffer memory in an interface between a disc drive and a host computer which permits fragmentation of the buffer memory so that data blocks read from sectors may be cached while fresh data may be stored in the buffer memory without interfering with the cached data and without losing useful data.

Various other objects, advantages and features of the present invention will become readily apparent from the ensuing detailed description, and the novel features will be particularly pointed out in the appended claims.

SUMMARY OF THE INVENTION

In accordance with this invention, a buffer memory is managed so as to communicate with first and second data devices, wherein a series of data blocks from the first device is written into available, but not necessarily sequential, addressable locations of the memory. An ordered address list of those buffer addresses into which the latest series of data blocks is written is created in a list register having register locations. The register location in which is stored the buffer address of the first data block in the series to be read from the memory to the second device is indicated, and the register locations in the ordered list which contain the buffer addresses that store the remaining data blocks in the series are successively indicated, thereby reading the series of data blocks from those addresses to the second device.

As a feature of this invention, a buffer controller operates to assign selected not necessarily sequential buffer addresses to store data blocks, which assigned addresses are loaded into register locations of the list register. Addresses from those locations are read, and a respective data block is written into each address thus read from the list register. Data is transferred from the buffer to the second device by accessing a sequence of register locations to retrieve the buffer addresses therein, and the data blocks stored in these retrieved buffer addresses are read out to the second device.

In accordance with an aspect of this invention, a first pointer is set to the register location in which the buffer address assigned to the first data block in a series is stored, and this pointer is advanced to successive register locations, thereby reading the buffer addresses into which the data blocks are written. A second pointer also is set to the register location in which is stored the buffer address assigned to the first data block of the series read from the first device; and this second pointer is advanced through a sequence of register locations to retrieve the buffer addresses stored therein. The data block stored in each retrieved buffer address is transferred to the second device.

In accordance with another aspect of this invention, the number of successive register locations of the list register through which the first pointer is advanced differs from the number of register locations through which the second pointer is advanced. Thus, the first pointer advances to identify those addresses into which data blocks called for by the second device as well as data blocks prefetched by the controller are written; whereas the second pointer advances merely to retrieve those addresses in which are stored the data blocks specifically called for by the host.

BRIEF DESCRIPTION OF THE DRAWINGS

The following detailed description, given by way of example, will best be understood in conjunction with the accompanying drawings in which:

FIGS. 2A–2H are schematic representations which are helpful in understanding the operation of the present invention.

DETAILED DESCRIPTION OF A PREFERRED EMBODIMENT

Figure 1:
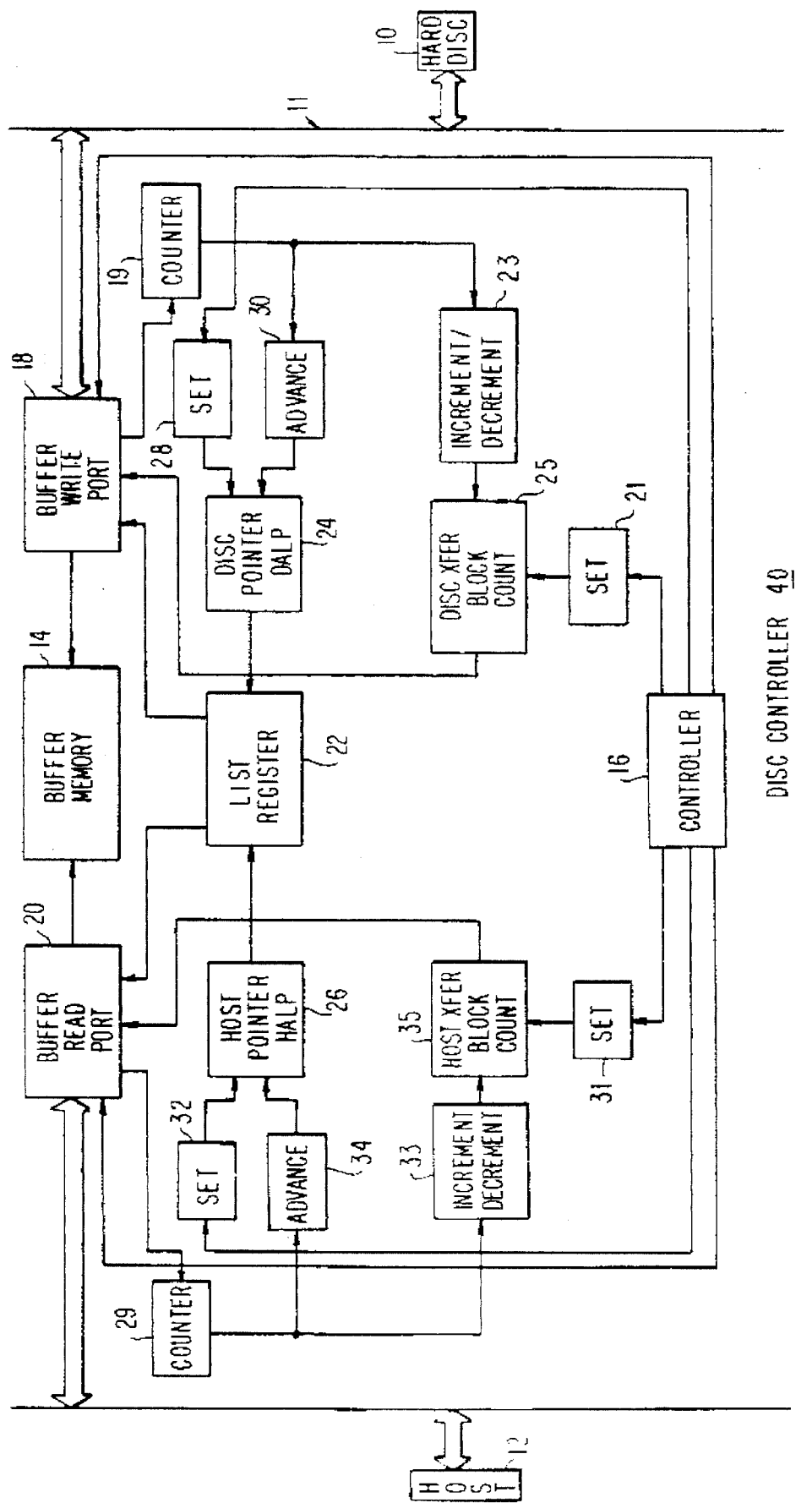
FIG. 1 is a block diagram illustrating a disc controller in which the present invention finds ready application.

Referring to FIG. 1, disc controller 40 is provided to communicate between data devices 10 and 12. For the purpose of the present description, data device 10 is illustrated as a disc storage device, such as one or more hard discs on which are recorded data in the form of data blocks, as is conventional to those of ordinary skill in the art, and data device 12 is illustrated as a host for supplying data to and reading data from disc 10. Typically, host 12 comprises a computer, such as a conventional microcomputer. Data is transferred between hard disc 10 and host 12 through disc controller 40. The disc controller 40 has a buffer memory 14, a buffer controller 16 and additional devices illustrated in the block diagram. Data is communicated between disc controller 40 and hard disc 10 by a bus 11, referred to as a disc bus; and data is communicated between host 12 and disc controller 40 by a bus 13, referred to as a host bus. The host bus may be a conventional SCSI bus. As thus far described, hard disc 10, host 12, disc controller 40 and busses 11 and 13 are conventional.

Buffer memory 14 is coupled to a buffer write port 18 which is adapted to write into the addressable locations of the buffer memory data blocks received from hard disc 10 or data blocks received from host 12. To simplify FIG. 1, buffer write port 18 is illustrated as being coupled only to disc bus 11, although it will be appreciated that the buffer write port also is coupled to host bus 13. Similarly, buffer memory 14 is coupled to a buffer read port 20 which is adapted to read data blocks stored in the buffer memory and to transfer those data blocks to host 12 or to hard disc 10. For simplification, the buffer read port is illustrated as being coupled only to host bus 13, but it will be appreciated that buffer read port 20 also is coupled to disc bus 11. Controller 16 is coupled to buffer write port 18 and to buffer read port 20 and is adapted to assign addresses of buffer memory 14 into which data blocks are written and from which data blocks are read. As is typical, controller 16 includes a conventional microprocessor and keeps track of those buffer addresses into which data blocks are written and from which data blocks are read, as well as the identities of those data blocks.

In a typical read operation, data blocks called for by host 12 are read from hard disc 10 and written into addresses of buffer memory 14 by buffer write port 18 under the control of controller 16 which preassigns those addresses to store the data blocks. Once one or more data blocks that have been read from the disc are stored in the buffer memory, buffer read port 20 reads out those data blocks from the preassigned addresses under the control of controller 16. The read out data blocks are transferred to host 12 via host bus 13. A typical write operation functions in a similar manner, except that data blocks now flow from host 12 to buffer memory 14 and then from the buffer memory to hard disc 10.

In accordance with a feature of the present invention, a list register 22 is provided for the purpose of creating an ordered list of those buffer addresses into which data blocks are written or from which data blocks are read. This list is described in greater detail below in conjunction with FIG. 2. List register 22 is comprised of plural register locations, each adapted to store a respective buffer address. A disc pointer 24 is adapted to point to, or identify, a register location of list register 22 so as to read a buffer address stored in the identified location. As will be described below, a data block is written into the address read from the list register by the disc pointer. A set circuit 28 functions to set the disc pointer to a selected register location as determined by controller 16. An advance circuit 30 functions to advance the disc pointer to successive register locations, as will be described. The particular address read from the register location identified by disc pointer 24 is supplied to buffer write port 18, thereby establishing the address into which a data block read from hard disc 10 is written.

In a similar manner, a host pointer 26 is coupled to list register 22 and functions to point to, or identify, a register location from which a buffer address is read. This buffer address is adapted to establish the address of the buffer memory from which a data block is read by buffer read port 20. A set circuit 32 is controlled by controller 16 to set host pointer 26 to a particular register location. As will be described, this register location normally is the location in which is stored the buffer address which contains the first data block in a series called for by host 12 from disc 10. An advance circuit 34 is adapted to advance the host pointer to consecutive register locations, thereby reading the buffer addresses stored in those locations and transferring to host 12 the data blocks that had been written into these addresses.

A counter 19 counts the number of bytes written into buffer memory 14 by buffer write port 18 to trigger advance circuit 30 when a complete data block has been written. A disc transfer block counter 25 is set by a set circuit 21 under the control of controller 16 to a count equal to the number of data blocks to be read from disc 10 and written into the buffer memory. When counter 19 detects a complete data block, an increment/decrement circuit 23 is triggered thereby to decrement the count of the disc transfer block counter. It will be appreciated that this count is decremented to a count of zero when a full series of data blocks has been written into buffer memory 14.

In a similar manner, counter 29, set circuit 31, host transfer block counter 35 and increment/decrement circuit 33 monitor the transfer of data blocks from the buffer memory to host 12 and to detect when the series of data blocks called for by the host has been so transferred.

The manner in which disc controller 40 operates to transfer data from, for example, hard disc 10 to host 12 will be described in greater detail hereinbelow with reference to FIGS. 2A–2H. Briefly, when a series of data blocks is called for by host 12 to be read from hard disc 10, controller 16 first assigns available buffer addresses to these respective data blocks. It will be appreciated that, as buffer memory 14 is filled, the assigned addresses may not necessarily be sequential addresses of the buffer memory.

After assigning buffer addresses to the data blocks called for by host 12, controller 16 selects successive locations in list register 22 into which those assigned addresses are written. Set circuit 28 is controlled by controller 16 to set disc pointer 24 to the first of these register locations; and set circuit 32 is similarly controlled to set host pointer 26 to that same location. Then, the buffer address stored in the register location identified by disc pointer 24 is read out and supplied to buffer write port 18 which then writes the first data block of the series read from disc 10 into this address. After this data block is written into the buffer memory, advance circuit 30 advances disc pointer 24 to identify the next successive register location. The address stored in this location is supplied to the buffer write port which then writes the next data block read from disc 10 into this address. The foregoing operation is repeated until disc pointer 24 has been advanced through the number of register locations corresponding to the number of assigned buffer addresses into which the data blocks called for by host 12 are written.

Once stored in the buffer memory, the data blocks are transferred to host 12 by buffer read port 20 which cooperates with list register 22. Host pointer 26 identifies the location in list register 22 in which is stored the buffer address that contains the first data block in the series read from disc 10. This address is read from the identified register location and supplied to buffer read port 20 which reads out the data block stored in that address. Hence, this data block is transferred from buffer memory 14 to host 12. Then, advance circuit 34 advances host pointer 26 to the next consecutive register location; and the buffer address stored therein is supplied to buffer read port 20 which now reads the data block contained in this address. The foregoing operation continues until host pointer 26 is advanced through those register locations in which are stored the buffer addresses that contain the data blocks in the series called for by the host.

The foregoing has described the manner in which data blocks are read from hard disc 10, stored in buffer memory 14 and then transferred to host 12. It is recognized that data blocks generated by the host may be written to the buffer memory, stored therein and then read out to be stored on hard disc 10. In this data write operation, host pointer 26 functions in the same manner as disc pointer 24 during a data read operation and, likewise, disc pointer 24 operates in the same manner as the host pointer during a data read operation. It also will be recognized that data read and data write operations may be interspersed, as when data blocks are called for by the host, manipulated or otherwise processed, and then returned to the disc. Nevertheless, the operation of controller 40 functions in substantially the same manner as has been discussed.

As is also typical of data transfer operations, controller 16, or an equivalent thereof, such as a managing controller, operates to prefetch data blocks from disc 10 which are not specifically called by the host 12. As mentioned previously, such prefetched data blocks are those which are likely to be called for by the host after the data blocks which had been specifically requested are processed. To save access time, such expected data blocks are prefetched and loaded into buffer memory 14 in the same way as data blocks which had been called for specifically. Often, however, such prefetched data blocks are not requested by the host and, thus, are not retrieved. Consequently, the number of buffer addresses into which data blocks are written exceeds the number of buffer addresses from which data blocks are retrieved. This means that disc pointer 24 may be advanced through a greater number of register locations than host pointer 26. This is taken into account by the present invention and does not affect the overall operation thereof, which has been discussed above and which will be described in greater detail below.

It also is appreciated that buffer memory 14 may be filled and, therefore, to enable the buffer memory to store additional data blocks called for from disc 10 by host 12, some of the filled buffer addresses must be reassigned to new data blocks by controller 16. The controller determines which of the data blocks stored in buffer memory 14 may be discarded or replaced by the new data blocks called for by the host; and the data blocks to be replaced are selected in accordance with a predetermined replacement algorithm known to those of ordinary skill in the art. The buffer addresses which formerly contained data blocks that are replaced are assigned to the new data blocks. That is, buffer addresses that had been loaded with previously read data blocks are overwritten by newly read data blocks.

FIG. 2 is a schematic representation of an addressable buffer memory 102 (sometimes referred to merely as a buffer) which is adapted to communicate with two data devices, such as a disc storage device and a host computer. As an example, buffer 102 may be included in an interface, such as a SCSI interface, wherein data blocks of predetermined size are read from the disc storage device (referred to herein for simplicity simply as the "disc"), written into addressable locations of the buffer memory and then read therefrom to the host computer (referred to for simplicity as a "host"), thus constituting a read operation. Conversely, data may be written into addressable locations of buffer memory 102 from the host and thereafter read from the buffer memory to be stored on the disc, thus constituting a write operation. It will be appreciated that those data blocks which are read from the disc and stored in the buffer memory are selected by the host. Such data blocks thus are "called for" by the host computer.

As is known, data is stored on a disc in "sectors"; and in one embodiment, each data block comprises one sector. Although the size of the data block stored on the disc may differ from the size of the data block supplied to or generated by the host, for simplification it will be assumed that a data block read from or written to the disc is of the same size (that is, it contains the same number of bytes) as a data block supplied to or generated by the host. Still further, and as is known by those of ordinary skill in the art, when the host calls for a particular data block, additional successive data blocks (which, typically, are stored in successive sectors) may be "prefetched" from the disc to the buffer.

In a typical embodiment, buffer memory 102 is comprised of 128 memory locations adapted to store 128 blocks. However, in the interest of simplification, buffer 102 is illustrated herein as comprising twelve addressable locations, each adapted to store a respective data block. As will be recognized by those of ordinary skill in the art, a data block typically is comprised of 512 bytes. However, in some applications, a data block may be comprised of 256 bytes; and in still other applications, a data block may be comprised of 1,024 bytes or any other desired number of bytes. The present invention is not limited by the precise size of the data block.

FIG. 2 also illustrates a list register 104 (i.e. a set of registers which represent a list) which, in this embodiment, is comprised of a smaller number of addressable locations (referred to as register locations) than buffer 102, and is adapted to store buffer addresses. Consistent with the simplified example described herein, buffer 102 is comprised of 12 addressable locations and the list register is comprised of 6 register locations adapted to store 6 of the 12 buffer addresses.

List register 104 is provided with respective pointers DALP and HALP associated with the disc drive and host, respectively, and for convenience are referred to as the disc and host pointers. As discussed above, the disc pointer DALP points to the next register location of list register 104 from which may be read the next buffer address to which the next data block read from the disc is to be stored. Stated otherwise, the disc pointer identifies the buffer address (stored in the list register) into which the next data block read from the disc is written. The host pointer HALP identifies the register location in which is stored the buffer address that contains the data block called for from the disc by the host computer. In the embodiment described herein, disc pointer DALP advances to point to sequential register locations as data blocks are written into buffer addresses; and the host pointer HALP likewise advances to identify a new register location each time that the host computer calls for a new data block. That is, the host pointer HALP points to the register location whose contents identify the buffer address in which is stored or will be stored the data block that should next be read to the host. When data blocks flow from the host to the disc, the host pointer HALP is used to identify the next buffer address in which a data block read from the host is stored and the disc pointer DALP is used to identify the next buffer address in which is stored the data block that should next be written to the disc.

Although not shown herein, it will be appreciated that the disc and host pointers DALP and FALP may be implemented by simple registers, each of which is incremented when buffer 102 is loaded/unloaded, as may be determined by a counter, such as counters 19 and 29 in FIG. 1, which counts the bytes in a data block written to or read from the buffer, thereby to identify a particular register location.

The sequence of operations of buffer 102 and list register 104, which illustrates the manner in which the buffer is managed, now will be described. To facilitate a ready understanding of the present invention, it will be assumed that the host computer calls for particular data blocks which are read from the disc and stored in buffer 102 to be transferred to the host computer at a later time. Such later time may be measured in microseconds or in substantially longer periods, such as seconds. It will be appreciated that data blocks may flow from the host computer to the disc, such as in a "data write" operation; and "data write" and "data read" operations may alternate, as when the host calls for a data block which is read from the disc, manipulated by the user, and then returned (or written) to the disc. Such bilateral data flow is easily accommodated by the present invention; but, as mentioned above, for simplicity a unilateral flow of data blocks from the disc to the buffer and thence to the host is assumed.

Initially, let it be assumed that the host has called for a series of data blocks which are numerically identified as data blocks 81, 82 and 83; and these data blocks are to be written into addresses 1, 2 and 3, respectively, of buffer 102 under the control of controller 16 shown in FIG. 1. Controller 16 controls set circuit 21 to set disc transfer block counter 25 to a count of 3, representing the number of data blocks to be read from the disc to buffer 102. As will be described, counter 19 counts the bytes in a block written into buffer 102; and when a complete block has been loaded, the counter triggers increment/decrement circuit 23 to decrement the count of disc transfer block counter 25. It will be appreciated that when the disc transfer block count has been decremented to zero, the particular number of data blocks called for by the host will have been written into the buffer and no further data blocks are read from the disc until another data read operation is executed.

Let it also be assumed that register locations 1, 2 and 3 of list register 104 are available for storing buffer addresses and that the controller selects these register locations to store the buffer addresses into which data blocks 81, 82 and 83 are to be written. Now, to establish this data read operation (that is, the operation by which data blocks are read from the disc), and before any data is transferred from the disc to the buffer, the controller writes buffer addresses 1, 2 and 3 into register locations 1, 2 and 3, respectively, and disc pointer DALP and host pointer HALP both are made to identify register location 1, as by set circuits 28 and 32 of FIG. 1. Thus, disc pointer DALP identifies the first register location in which is stored the next buffer address (assumed herein to be buffer address 1) into which a data block next read from the disc (assumed herein to be data block 81) is to be loaded. Also, host pointer HALP identifies the first register location as the next register location in which is stored the buffer address from which the next data block is fetched and transferred to the host.

Now, when all of the bytes in data block 81 are read from the disc into buffer address 1, counter 19 triggers advance circuit 30 of FIG. 1 to advance the disc pointer DALP to point to the next sequential register location (i.e. the second register location) in which is stored buffer address 2 adapted to store the next data block 82 to be read from the disc. At the same time, the count of disc transfer block counter 25 is decremented (FIG. 1). When data block 82 is read and loaded into buffer address 2, the disc pointer DALP advances to point to the third register location in which is stored buffer address 3 adapted to store the next data block 83 that will be read from the disc and the count of the disc transfer block counter is decremented. When data block 83 is read, the disc pointer DALP advances to the fourth register location (which is assumed to be empty) data block 83 is written into buffer address 3 and the count of the disc transfer block counter is decremented to a count of zero. Thus, as successive data blocks are read from the disc and written into buffer addresses 1, 2 and 3, counter 19 triggers advance circuit 30 (FIG. 1) to advance the disc pointer DALP from identifying the first register location to the second, then the third and ending with the fourth register location, and the disc transfer block count is decremented from a count of 3 to 2 to 1 to zero.

When data block 83 is written into buffer address 3, the disc pointer advances to identify the fourth register location and the data read operation is interrupted. Similarly, if the data blocks stored in buffer 102 are transferred to the host to complete the read operation, counter 29 (FIG. 1) counts the number of bytes that are transferred to trigger advance circuit 34 when a block has been read, thereby advancing the host pointer HALP from the first to the second, to the third and finally to the fourth register location as data blocks 81, 82 and 83 are read from buffer addresses 1, 2 and 3, respectively. Likewise, controller 16 controls set circuit 31 to set host transfer block counter 35 to a count of 3, representing the number of data blocks to be read from buffer 102 to the host, as called for by the host. As counter 29 triggers advance circuit 34 to advance the host pointer HALP, it also triggers increment/decrement circuit 33 to decrement the host transfer block counter. When this count is decremented to zero, the particular number of data blocks called for by the host will have been transferred thereto and no further data blocks are transferred until the next data read operation is executed. After data block 83 is read from buffer address 3, the host pointer advances from the third to the fourth register location.

Let it now be assumed that, before any of these data blocks 81, 82, 83 are read from the buffer to the host, the host calls for the series of data blocks 121 and 122; and the controller selects buffer addresses 4 and 5 to store these data blocks. Assuming that the fourth and fifth register locations of list register 104 are available, the controller selects register locations 4 and 5 to store buffer addresses 4 and 5, respectively, and these buffer addresses 4 and 5 are written into the fourth and fifth register locations. The disc pointer DALP, which pointed to the fourth register location at the completion of the aforedescribed disc-to-buffer transfer operation, identifies buffer address 4 as the address into which is loaded data block 121 when this data block is read from the disc. The host pointer HALP likewise points to this register location. As before, disc transfer block counter 25 and host transfer block counter 35 (FIG. 1) are set to the number of data blocks (i.e. 2) called for by the host. When data block 121 is loaded into the buffer, the disc pointer DALP advances to point to the fifth register location in which is stored buffer address 5 and the disc transfer block count is decremented from 2 to 1. If data block 121 is not supplied at this time to the host, the host pointer HALP remains pointing to this fourth register location. Next, data block 122 is read from the disc to the buffer address identified by the disc pointer DALP, that is, to buffer address 5. Accordingly, the disc pointer then advances to point to the sixth register location and the disc transfer block count is decremented to zero.

At this time, the disc pointer DALP identifies register location 6 (assumed right now to be empty) as the next location from which may be read a buffer address to which the next data block read from the disc is stored, and the host pointer HALP identifies the fourth register location in which is stored the buffer address that contains the previous data block that had been called for by, but not yet supplied to, the host. FIG. 2A illustrates the foregoing operation, wherein the disc pointer DALP shown in solid lines represents the final position thereof and the broken lines represent the starting and advancing positions of the disc pointer. Likewise, the solid lines represent the final position of the host pointer HALP and the broken lines represent the starting and advancing positions thereof to read out data blocks from buffer 102 to the host. From FIG. 2A it is appreciated that there is ample capacity remaining in buffer 102 to store additional data blocks without the risk of "overwriting" any of the data blocks already stored therein. It also will be appreciated that controller 16 monitors the contents of the buffer and thus is aware of the locations therein in which the data blocks called for by the host are stored.

With the condition of buffer 102 and list register 104 as shown in FIG. 2A, let it now be assumed that the host calls for the series of data blocks 315 and 316, which are to be read from the disc and stored in the next available addresses of the buffer. As shown in FIG. 2B, the controller selects buffer addresses 6 and 7 to store data blocks 315 and 316. For convenience, previously stored data blocks and previously stored buffer addresses are indicated in broken lines and the series of data blocks newly called for by the host as well as newly selected buffer addresses are indicated in solid lines. The controller also selects register locations 6 and 1 to store buffer addresses 6 and 7, respectively, and buffer address 6 is stored in the sixth register location and buffer address 7 is stored in the first register location. Now, to load data block 315 into buffer address 6, the contents of the sixth register location (now identified by the disc pointer DALP) are read and the data block is written to buffer address 6 (i.e. the contents of this register location). The host pointer HALP advances to identify the sixth register location as the location in which is located the buffer address that stores the first data block in the latest series called for by the host and the disc pointer DALP advances (or returns) to the first register location (from the sixth register location to which it had pointed at the beginning of the operation represented by FIG. 2B) in which buffer address 7 is stored. When data block 316 is read from the disc it is stored in buffer address 7 (identified by the disc pointer DALP) and the disc pointer advances to the next sequential register location, which is seen to be the second location of list register 104. If data block 315 is transferred from the buffer to the host, the host pointer HALP advances from the sixth register location, which stored the buffer address in which was loaded the first in the series of data blocks called for by the host, to the first register location, which stores buffer address 7 in which is loaded the next data block 316 to be read to the host. It is appreciated that disc transfer block counter 25 and host transfer block counter 35 are set to the number of data blocks called for by the host and are decremented with each data block written into buffer 102 and transferred to the host, respectively.

It is seen that the buffer address which had been stored previously in register location 1 was overwritten by the controller with a new buffer address. However, at this time, since buffer 102 is not filled, the overwriting of portions of the address list being created in list register 104 does not affect or eliminate any of the data blocks presently stored in buffer 102 and the controller continues to register the buffer storage locations of these data blocks. Thus, data block 81 remains stored in buffer address 1 and may be read therefrom to the host computer by the controller when requested.

From the condition represented by FIG. 2B, it now is assumed next that the host calls for the series of data blocks 221, 222 and 223 to be read from the disc; and that the controller selects buffer addresses 8, 9 and 10 to store these data blocks. The controller determines that buffer addresses 8, 9 and 10 should be stored in the second, third and fourth register locations and overwrites the previous entries in these register locations with the buffer addresses in which these new data blocks are to be stored. At the beginning of this data read operation, both the disc pointer DALP and the host pointer HALP identify the second register location, and disc transfer block counter 25 and host transfer block counter 35 are set to the number of data blocks called for by the host (i.e. 3). To carry out this data read operation, buffer address 8 is read from the second register location by the disc pointer and the first data block 221 in this series is loaded into this buffer address. It is appreciated that the host pointer HALP, which now points to the second register location of list register 104, identifies the buffer address in which the first data block of the latest series that had been called for by the host during this read operation is stored.

When data block 221 is written into buffer address 8, the disc pointer DALP advances from the second register location to the next succeeding register location to identify the buffer address that will store data block 222; and this data block 222 is written into buffer address 9. The disc pointer now advances to the fourth register location to identify buffer address 10 that will contain data block 223, the last data block in the series called for by the host. When this data block is read from the disc and loaded into buffer address 10, the disc pointer DALP advances to identify the fifth register location, which is the next location from which the next buffer address selected by the controller will be read. The count of disc transfer block counter 25, which is decremented as each data block is loaded into buffer 102, will now have been decremented to a count of zero.

In the data read operation discussed above, it will be appreciated that data blocks 222 and 223 may be specifically called for by the host or, alternatively, these data blocks may be prefetched in a manner known to those of ordinary skill in the art when data block 221 is called for. If the data blocks are specifically called for by the host, the host pointer HALP advances from one register location to the next, in sequence, to identify buffer address 8, then 9, then 10 to read data block 221, then block 222 and then block 223 from the buffer to the host; and host transfer block counter 35 is decremented from its set count of 3 to zero. But, if data blocks 222 and 223 are prefetched, the host transfer block counter is set only to a count of 1 and the host pointer HALP is set to identify buffer address 8 only, so as to read data block 221 from the buffer to the host. Thereafter, the host pointer is advanced to the next (i.e. the third) register location while host transfer block counter 35 is decremented to zero. Consequently, the contents of the buffer address stored in that third register location are not read.

From the condition shown in FIG. 2C it is seen that two buffer addresses remain available to store data blocks. Consistent with the example described herein, let it be assumed that the host calls for data blocks 15 and 16 and, as shown in FIG. 2D, the controller selects buffer addresses 11 and 12, respectively, to store these data blocks. The controller determines that buffer addresses 11 and 12 are to be stored in the fifth and sixth register locations and overwrites the previous entries therein. At the beginning of this data read operation, the disc pointer DALP and the host pointer HALP both are advanced to identify the fifth register location which had been selected by the buffer as the location in which buffer address 11 is to be stored and the disc and host transfer block counters both are set to the count of 2, representing the number of data blocks called for by the host. Now, the disc pointer DALP reads buffer address 11 from the list register, and data block 15 which had just been called for by the host is written into buffer address 11. The disc pointer DALP advances to the sixth register location and the disc transfer block counter is decremented by one. If the controller determines that a data block now should be transferred to the host, the buffer address identified by the host pointer HALP (i.e. buffer address 11) is read and the data block stored at this buffer address (i.e. data block 15) is read to the host. The host pointer then advances to the next register location and the host transfer block counter is decremented by one.

The disc pointer DALP, which now points to the sixth register location of list register 104, identifies buffer address 12 therein, and data block 16 is loaded from the disc to this buffer address. The disc pointer then advances to the next successive register location, which is seen to be the first location, and the disc transfer block counter is decremented to zero when data block 16 is written to buffer address 12.

From the condition illustrated in FIG. 2D, it now is assumed that the host calls for the series of data blocks 175 and 176. Since buffer 102 is filled, the controller determines which of the data blocks stored in the buffer may be discarded or replaced by the new data blocks now called for by the host. The data blocks to be replaced in the buffer are selected in accordance with a predetermined replacement algorithm known to those of ordinary skill in the art. For the purpose of the present explanation it is assumed that the controller selects data blocks 82 and 83 for replacement. Accordingly, buffer addresses 2 and 3, which had stored these data blocks, now are selected to store new data blocks 175 and 176. In addition, the controller determines that buffer addresses 2 and 3 are to be stored in the first and second register locations and these addresses are written thereinto.

At the beginning of the data read operation represented by FIG. 2E, disc pointer DALP and host pointer HALP both are set to identify the first register location and the disc and host transfer block counters are set to 2 (the number of data blocks to be read from the disc and transferred to the host). Hence, buffer address 2 is read from the first register location by the disc pointer and data block 175 is written into this address from the disc. The disc pointer DALP then advances to the next successive register location (i.e. to the second location) from which buffer address 3 is read and into which data block 176 is loaded. The disc pointer than advances to the next successive register location, that is to the third register location when data block 176 is loaded into the buffer. The disc transfer block counter, which is decremented as each data block is loaded, now reaches the count of zero. The host pointer HALP, which is pointing to the first register location, reads buffer address 2 therefrom, and data block 175 is transferred from this buffer address to the host. The host pointer then advances to the second register location to identify buffer address 3 from which data block 176 is transferred to the host. Thereafter, the host pointer advances to the third register location and the host transfer block counter is decremented to the count of zero.

From the condition represented by FIG. 2E, it is assumed that the host next calls for the series of data blocks 401, 402 and 403. Since buffer 102 is filled, the controller selects data blocks previously stored therein for replacement, as aforementioned. It is assumed that the replacement algorithm selects data blocks 122, 316 and 223, which had been stored in buffer addresses 5, 7 and 10, for replacement. Consequently, the controller reassigns buffer addresses 5, 7 and 10 to store data blocks 401, 402 and 403, respectively. In addition, the controller selects the third, fourth and fifth register locations to store buffer addresses 5, 7 and 10.

At the beginning of this data read operation, disc pointer DALP and host pointer HALP both point to the third register location, the location in which is stored buffer address 5 which is to store data block 401, and the disc and host transfer block counters both are set to a count of 3. To execute the read operation, the disc pointer DALP retrieves buffer address 5 from the third register location; and data block 401 is loaded into that buffer address. The disc transfer block counter is decremented and the disc pointer then advances to the fourth register location to retrieve buffer address 7. Data block 402, is written into buffer address 7. Then, the disc transfer block counter is decremented and the disc pointer advances to the fifth register location from which is read buffer address 10. Data block 403 is loaded into that buffer address. The disc transfer block counter is decremented to a count of zero and disc pointer DALP then advances to the next register location, that is, to the sixth register location, when data block 403 is written into buffer address 10.

To transfer these data blocks from the buffer to the host, the host pointer HALP advances from the third register location in which is stored buffer address 5, which contains the first data block (i.e. data block 401) in the series most recently called for by the host, to the fourth register location and then to the fifth register location. With each advance, the host transfer block counter is decremented and the buffer address identified by the host pointer has the data block stored therein read to the host. Hence, data blocks 401, 402 and 403 are transferred. Thereafter, the host transfer block count is reduced to zero and the host pointer HALP advances to the sixth register location.

After the condition shown in FIG. 2F has been reached, it is assumed that the host next calls for the series of four data blocks 241, 242, 243 and 244. Once again, the controller selects data blocks stored in buffer 102 for replacement. In accordance with the aforementioned replacement algorithm, it is assumed that data blocks 81, 176, 222 and 16 are selected. Accordingly, and under the control of the controller, buffer address 1 is assigned to store data block 241, buffer address 3 is assigned to store data block 242, buffer address 9 is assigned to store data block 243 and buffer address 12 is assigned to store data block 244. The controller also writes buffer addresses 1, 3, 9 and 12 into the sixth, first, second and third register locations, respectively, of list register 104, sets both the disc pointer DALP and the host pointer HALP to point to the sixth register location (i.e. the register location in which is stored the buffer address to which the first of these data blocks is to be written), and sets the disc and host transfer block counters 25 and 35 to a count of 4. It is recalled that, at this time, the disc pointer already is pointing to the sixth register location.

To execute the read operation, the disc pointer DALP reads from the sixth register location buffer address 1 and data block 241 read from the disc is loaded into this buffer address. The disc pointer then advances to the first, second, third and fourth register locations in the manner discussed above. As the disc pointer advances, the buffer address identified thereby is read from list register 104 and the successive data blocks read from the disc are loaded into each buffer address so read while the disc transfer block count is decremented. Hence, and as shown in FIG. 2G, data blocks 241, 242, 243 and 244 called for by the host are stored in non-successive buffer addresses 1, 3, 9 and 12, respectively.

Now, to transfer these data blocks to the host, the controller reads the buffer address to which the host pointer HALP points and the data block stored in this buffer address is read out to the host. Hence, buffer address 1 stored in the sixth register location (to which the host pointer points) is identified, and data block 241 is read from this buffer address to the host. The host transfer block count is decremented and the host pointer advances to the next register location (i.e. the first register location) and the foregoing process is repeated. Consequently, the host pointer HALP advances sequentially to the third register location and data blocks 241, 242, 243 and 244 are read out in sequence from buffer 102 to the host as the host pointer advances. At the same time, the host transfer block count decrements to a count of zero.

The foregoing examples have assumed that the host calls for data blocks which must be retrieved from the disc and then stored temporarily in buffer 102 before being read to the host. Let it now be assumed that the host calls for a series of data blocks which are already stored in the buffer because of prior read operations. For example, these requested data blocks may have been prefetched or the host simply wishes to re-read them. In any event, it is assumed that the host calls for data blocks 15, 121, 221 and 315 in that order. From FIG. 2G, it is seen that these data blocks remain stored in buffer addresses 11, 4, 8 and 6, respectively, and there is no need to re-read these data blocks from the disc.

The buffer controller selects the first, second, third and fourth register locations to which buffer addresses 11, 4, 8 and 6 are written, as shown in FIG. 2H (although other register locations may be selected, as will be appreciated). In addition, the host pointer HALP is set to point to the first register location and the host transfer block counter is set to a count of 4. At this time, the disc transfer block count remains at zero. For the present data transfer operation, since data blocks are not read from the disc, the controller makes no change in the position of the disc pointer DALP. Now, to execute this data transfer, the buffer address stored in the register location to which the host pointer HALP points is read and the data block loaded into that buffer address is transferred to the host. The host transfer block count is decremented and the host pointer then advances to the next successive register location to repeat this process. Thus, buffer address 11 is read from the first storage location, data block 15 stored in buffer address 11 is transferred to the host, and the host pointer HALP advances to the second register location. In this manner, data blocks 15, 121, 221 and 315 are transferred, in sequence, from buffer 102 to the host. The controller terminates this transfer operation after data block 315 is transferred, at which time the host pointer will have advanced to the fifth register location, as shown in FIG. 2H, and the host transfer block count will have been decremented to zero.

From the foregoing description, it is appreciated that, even though data blocks are stored in fragmented form in buffer 102, an address list is compiled by the controller in list register 104 to identify, in sequence, those buffer addresses in which the proper order of data blocks stored in buffer 102 may be read to the host. The host pointer HALP identifies the first buffer address in this order, thereby facilitating the reading of data blocks in the sequence called for by the host.

While the present invention has been particularly shown and described with reference to a preferred embodiment thereof, it will be readily appreciated by those of ordinary skill in the art that various changes and modifications may be made without departing from the spirit and scope of the invention. For example, disc controller 40 of FIG. 1 has been described in the context of circuit, or hardware, implementation thereof. However, it will be recognized that many of the functions described therefor may be implemented by software. Furthermore, although buffer addresses have been stored in successive register locations in list register 104, the sequence of such locations need not be successive. In that event, advance circuit 30 may control the disc pointer (and, similarly, advance circuit 34 may control the host pointer) to establish a desired sequence of register locations in which the buffer addresses are stored. It is intended that the appended claims be interpreted as including the embodiment specifically described herein as well as all equivalents thereto.

What is claimed is:

1. A method of managing a buffer memory which communicates with first and second data devices, said buffer memory having addressable locations into which data blocks are written and from which data blocks are read, comprising the steps of:

writing successive series of data blocks from said first device into available, not necessarily sequential, locations of said buffer memory, the data blocks in a respective series being in a sequential order;

creating in a list register having register locations an ordered address list of buffer memory addresses which identify the addressable locations of said buffer memory into which the latest series of data blocks is written the register locations in which said ordered list is created being in sequence equal to said sequential order of the data blocks in said latest series;

indicating the register location in which is stored the buffer memory address of the first data block in said series to be read from said buffer memory to said second device; and progressively indicating the register locations in said sequence in said ordered address list which contain the buffer memory addresses which store additional data blocks in said series to read said additional data blocks from said buffer memory to said second device.

2. The method of claim 1 wherein the step of writing a series of data blocks into said buffer memory comprises providing a write pointer to identify a register location in said list register, reading the buffer memory address stored in the register location identified by the write pointer, writing a data block into the buffer memory address read from the register location identified by the write pointer, and advancing said write pointer to identify a next register location.

3. The method of claim 2 wherein said step of creating an ordered address list comprises loading into a selected number of register locations of said list register respective buffer memory addresses into which the series of data blocks is to be written.

4. The method of claim 3 wherein buffer memory addresses previously stored in at least some of said selected number of register locations are overwritten when the respective buffer memory addresses into which the series of data blocks is to be written are loaded into said list register.

5. The method of claim 4 wherein said step of creating an ordered list further comprises pre-assigning selected buffer memory addresses for storing the series of data blocks to be written therein.

6. A method of managing a buffer memory for the transfer of data between first and second devices, said buffer memory having addressable locations into which data blocks are written and from which data blocks are read, said method comprising the steps of:

assigning selected, not necessarily sequential, buffer memory addresses to store data blocks included in successive series of data blocks supplied from said first device, the data blocks in a respective series being in a sequential order;

loading into selected register locations of a list register the buffer memory addresses which have been assigned to store the data blocks in a respective series, said selected register locations being in sequence equal to said sequential order of the data blocks in the latest series;

reading buffer addresses from an ordered list of the sequence of register locations and writing a data block into a buffer memory address read from a register location; and accessing progressive register locations in said sequence to retrieve buffer memory addresses loaded therein for transferring to said second device the data blocks stored in the retrieved buffer memory addresses.

7. The method of claim 6 wherein the register locations in said ordered list of register locations into which the assigned buffer memory addresses are loaded differ from said progressive register locations from which buffer memory addresses are retrieved.

8. The method of claim 6 wherein the step of reading buffer memory addresses from said ordered list of register locations comprises:

initially pointing to the register location in which is loaded the buffer memory address which is assigned to the first data block in said series, and pointing to a next register location when a data block from said first device is written into the buffer memory address read from the previously pointed register locations.

9. The method of claim 8 wherein the step of pointing to a next register location continues from location to location in response to the writing of a data block into a respective buffer memory address until all of the data blocks in said series have been written into their respectively assigned buffer memory addresses.

10. The method of claim 6 wherein said step of loading the assigned buffer memory addresses into selected register locations includes overwriting buffer memory addresses that may have been loaded previously into said register locations.

11. The method of claim 10 wherein the step of accessing progressive register locations to retrieve buffer memory addresses comprises initially identifying the register location in which is loaded the buffer memory address assigned to the first data block in a series supplied from said first device, and identifying a next register location when a data block is transferred to the second device from the buffer memory address retrieved from the previously identified register location.

12. The method of claim 11 wherein the step of identifying a next successive register location continues from location to location in response to the transferring of a data block from a respective buffer memory address until all of the data blocks in said series have been transferred.

13. The method of claim 6 wherein said step of assigning selected buffer memory addresses to store data blocks includes assigning a buffer memory address that may presently store a data block, such that the presently stored data block is overwritten by a new data block included in the series of data blocks supplied from said first device.

14. Apparatus for transferring data from a first device to a second device, wherein a buffer memory having addressable locations stores successive series of data blocks received from said first device in addresses selected by a buffer controller, the data blocks in a respective series being in a sequential order, said apparatus comprising:

list register means having plural register locations for storing buffer memory addresses written thereinto by said buffer controller, said buffer memory addresses being written into sequential register locations, the sequence of which is equal to said sequential order of the data blocks in the last received series;

first pointer means for reading out the buffer memory addresses written into the sequence of register locations in said list register means to create an ordered list of buffer memory addresses;

buffer write means for writing a data block from said first device into the buffer memory address read from said list register means;

second pointer means for accessing progressive locations of said list register means to retrieve therefrom the ordered list of buffer memory addresses; and transfer means for transferring to said second device the data blocks stored in the buffer memory at the retrieved buffer memory addresses.

15. The apparatus of claim 14 wherein the number of register locations of the list register means from which buffer memory addresses are read by said first pointer means differs from the number of register locations of the list register means from which buffer memory addresses are retrieved by said second pointer means.

16. The apparatus of claim 14 wherein the data blocks written into the buffer memory memory are called for by said second device and are included in a series of data blocks, and wherein said controller is operable to set said first pointer means to the register location of said list register means in which is stored the buffer memory address selected by said controller to store the first data block in the series called for by said second device.

17. The apparatus of claim 16 further comprising means for advancing said first pointer means to a next register location in said ordered list when a data block is written into the buffer memory address last read from said list register means.

18. The apparatus of claim 16 wherein said controller is operable to set said second pointer means to the register location of said list register means in which is stored the buffer memory address selected by said controller to store the first data block in the series called for by said second device.

19. The apparatus of claim 18 further comprising means for advancing said second pointer means to a next register location in said ordered list when a data block is transferred to said second device from the buffer memory address last retrieved from a register location in said list register means.

20. The apparatus of claim 19 wherein said controller is operable to prefetch data blocks not called for by said second device, said prefetched data blocks and the data blocks called for by said second device being written into buffer memory addresses selected by said controller, which buffer memory addresses are stored in said list register means; and wherein said means for advancing said second pointer means includes means for stopping said second pointer means after the last data block in a series called for by said second device is transferred to said second device.

21. The apparatus of claim 14 wherein the progressive register locations of said list register means from which the buffer memory addresses are retrieved differ from the selected register locations of said list register means from which the buffer memory addresses are read, and wherein said controller is operable to select a sequence of register locations and to write into the register locations of said selected sequence designated buffer memory addresses which subsequently are retrieved from said selected sequence of register locations by said second pointer means to transfer to said second device those data blocks which are stored in the retrieved buffer memory addresses.

22. The apparatus of claim 21 wherein said controller is operable to designate those buffer memory addresses in which are stored data blocks called for by said second device.

23. The apparatus of claim 14 wherein said controller is operable to overwrite buffer memory addresses previously written into at least some of said selected register locations with newly selected buffer memory addresses.

24. The apparatus of claim 23 wherein said controller is operable to select buffer memory addresses to be written into said list register means and to have data blocks written thereinto by said buffer write means, wherein said selected buffer memory addresses already store data blocks that had been previously written thereinto, whereby the previously stored data blocks are overwritten by new data blocks received from said first device.

25. The apparatus of claim 16 wherein the data blocks written into the buffer memory are called for by said second device and are included in a series of plural data blocks, wherein said controller is operable to set both said first pointer means and said second pointer means to the register location of said list register means in which is stored the buffer memory address selected by said controller to store the first data block in the series called for by said second device, and further including means for advancing said first pointer means to a number of register locations in said ordered list corresponding to the number of data blocks included in said series and means for advancing said second pointer means to access those register locations to which said first pointer means is advanced.

* * * * *

UNITED STATES PATENT AND TRADEMARK OFFICE
CERTIFICATE OF CORRECTION

PATENT NO. : 5,539,897
DATED : Jul. 23, 1996
INVENTOR(S) : Samanta et al.

It is certified that error appears in the above-indentified patent and that said Letters Patent is hereby corrected as shown below:

Column 16,
Claim 5, line 2: Change "pre-assigning" to
    --assigning--.
Column 17,
Claim 16, line 2: Immediately after "buffer",
    delete "memory".

Signed and Sealed this

Fifteenth Day of October, 1996

Attest:

BRUCE LEHMAN

*Attesting Officer*       *Commissioner of Patents and Trademarks*